H. H. BEACH.
Improvement in the Process and Apparatus for Curing Corn and other Grains.
No. 126,511. Patented May 7, 1872.
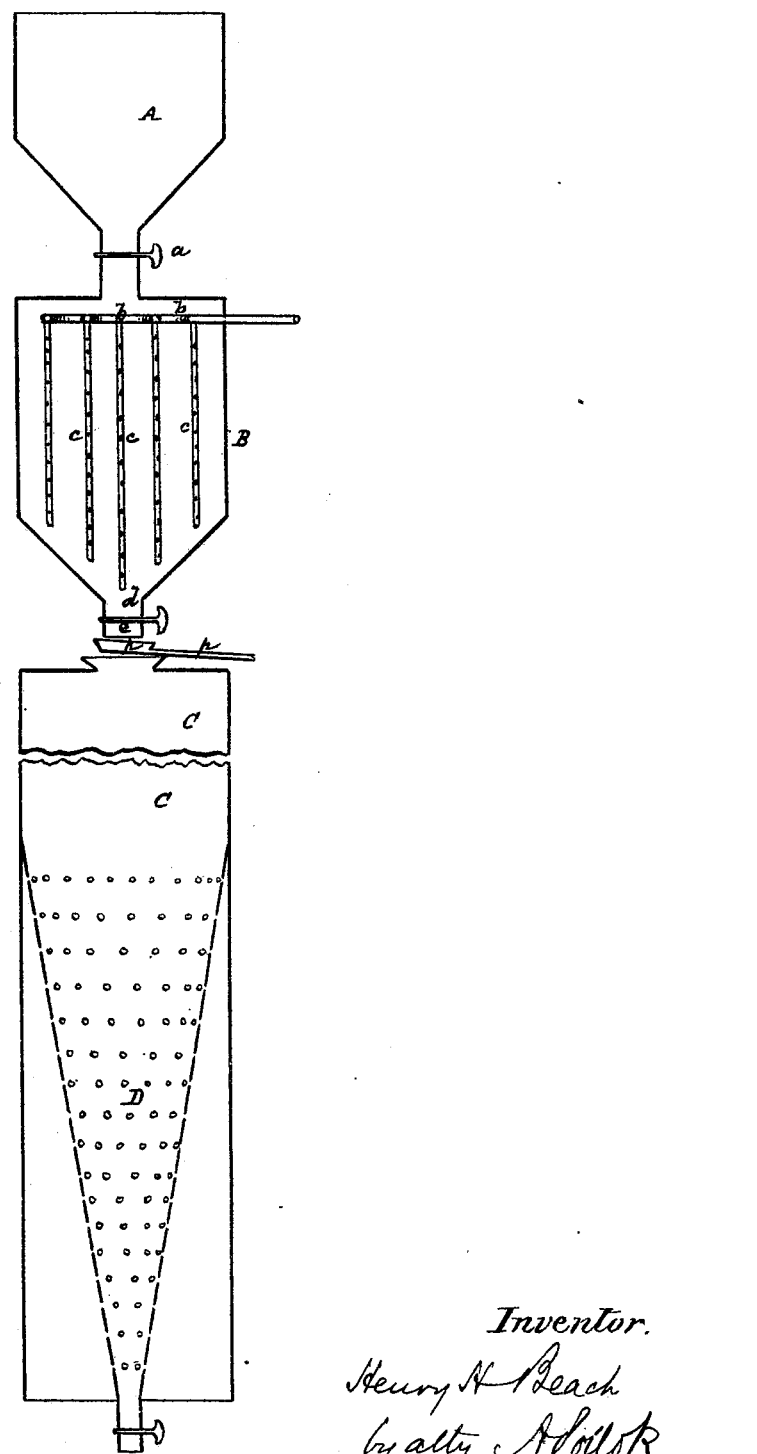
Witnesses.
Inventor.

UNITED STATES PATENT OFFICE.

HENRY H. BEACH, OF ROME, NEW YORK.

IMPROVEMENT IN PROCESSES AND APPARATUS FOR CURING CORN AND OTHER GRAINS.

Specification forming part of Letters Patent No. 126,511, dated May 7, 1872.

*To whom it may concern:*

Be it known that I, HENRY H. BEACH, of Rome, Oneida county, New York, have invented a new and useful Process of and Apparatus for Curing Corn and other Grain, and destroying the germ therein, of which the following is a specification:

The principal feature of my invention consists in a mode of destroying the germ in corn or other grain by bringing the grain in direct contact with steam, to the action of which it is subjected until the germ is effectually destroyed, the grain being subsequently dried and freed from the moisture absorbed by it during the steaming process.

This process is much more effective and is better on every account than the ordinary kiln-drying or dry-heating processes, for not only is the germ effectually destroyed without danger of scorching or burning the grain, but all the grain is evenly and thoroughly cured, and there is no liability of uneven heating resulting in imperfect curing of certain portions of the grain, as is the case with ordinary processes in use.

In the accompanying drawing I have represented an apparatus adapted to carry out my process, and to this I will now refer, in order to better explain the manner in which my invention is or may be carried into effect.

The drawing represents a vertical central section of the apparatus.

A is the hopper, from which the grain to be treated may be fed into the steam-chamber B. Between the two is a valve, $a$, by which admission of grain to the steam-chamber can be regulated. The steam-chamber B may be made of any suitable form and material. Within it are placed steam-pipes, which I prefer to arrange as shown. There are two, three, or more concentric annular pipes, $b$, from each of which extend, at suitable distances apart, a series of vertical pipes, $c$, closed at their lower ends, and perforated throughout their length with any desired number of holes. I find it best to place the pipes so that there shall not be more than six inches between any two, whether of the same or different series, and the outer pipes should be about three inches from the walls of the chamber. The nearer the pipes are to one another the less time will be consumed in the process; and for this reason I prefer to put them as closely together as above indicated. But, of course, the operation can be carried on with pipes arranged further apart, the only difference being that in this case more time will be required to properly steam the grain; although, if the pipes be put too far apart, there would be danger of over-heating the grain nearest the pipes. I would also state, that while the above arrangement is convenient for effecting the introduction of steam into the mass of grain, yet I do not limit myself to the employment of the special devices described, as other means may be employed for the same object—viz., the introduction of the steam into the chamber in such manner as to cause all the grain contained therein to be subjected to its action.

The lower end of the chamber B is funnel-shaped, terminating in a pipe, or conduit, $d$, provided with a perforated slide, $e$, which will hold the grain in, while allowing the water of condensation to escape. To conduct this water a removable pipe is fitted to the lower end of the conduit to conduct the water away from the drier C, which, as shown, is placed some little distance—say, from eight to twelve inches—below the steam-chamber. The drier, which, in this instance, has the form of a long hollow column, has an opening in the top, closed by a properly-fitting slide, which is drawn back to uncover the opening when the grain from the chamber B is ready to be discharged. Within the drier is a funnel, D, with steep and perforated sides, and opening out through the bottom of the drier, where it is provided with a suitable valve. The sides of the funnel are placed at an angle of eighty degrees with the horizontal for the purpose of better assuring the discharge of the successive charges of grain dropped from the steam-chamber. If the sides of the funnel are inclined at a much less angle to the horizontal than that above specified the grain next to the sides of the funnel will not pass freely to the lower end or discharge-opening, but will be delayed by the central portion of the grain, which will pass through the opening to the exclusion of the exterior portion. When, however, the sides are inclined at about the angle stated, the whole charge will pass down evenly through the funnel.

The grain in the drying shaft or column is dried by means of a current of air, which is caused to pass through the perforations in the funnel, and thence up through the mass of grain in any suitable manner—either by means of a blast or by means of suction—as is customary in grain-drying apparatus.

The perforated funnel, owing to its shape, is peculiarly adapted to present the grain most advantageously to the action of the drying agent. I prefer to employ a current of heated air, but this is a matter which may be left to the discretion of the user of the apparatus.

The steam-chamber is provided with one or more thermometers to indicate the degree of heat to which the grain is raised.

The mode of operation is as follows: Grain from the hopper is discharged into the steam-chamber until the latter is properly filled. The valve between the hopper and chamber is then closed and steam is turned on. This steam permeates the grain, and the water of condensation passes out from the lower end of the chamber, being conducted away from the drying-box by a removable pipe, indicated at $p$ in the drawing. The grain is gradually heated by the steam until the steam ceases to wholly condense, and passes out through the perforated valve. When this takes place the thermometer on the steam-chamber will indicate about 210°, which I find to be a sufficiently high degree of heat for the grain for all practical purposes, the germ, when this is reached, being effectually destroyed. If, however, a higher degree of heat be desired, a close steam-tight valve may be employed in lieu of the perforated slide, and thus the steam-pressure in the chamber can be raised to any required degree. The length of time needed to complete the heating varies with the proximity of the pipes to one another and their dimensions. When they are placed as near to each other as hereinbefore specified, and a sufficient quantity of steam is supplied to them, the time required for a heat will not be over five minutes. When the grain is ready to be discharged steam is shut off, the pipe $p$ is removed, the slide in the top of the drier is drawn back, the perforated slide is opened, and the grain falls through the drier into the funnel. The current of heated or cold air is now caused to pass up through the charge until the grain is thoroughly dried, when it is drawn off from the lower end of the funnel into any suitable bin or receptacle.

The advantages of the above-described process are many. Not only is it free from the objections attending the dry-heating or kiln-drying processes, but the grain is brought to a much better condition, and is renewed and made sweet, even if it should previously have been somewhat musty. This result is due to the treatment of the grain by direct contact with steam, which not only penetrates the mass of grain, but enters and acts separately upon each kernel. The subsequent operation to remove the moisture absorbed by the grain in its steam treatment is of course necessary, in order to prevent the grain when stored from heating and spoiling.

Having described my invention, and the manner in which the same is or may be carried into effect, I would state, in conclusion, that while I have described an apparatus well adapted to carry out this process, I do not limit my claim to that special apparatus, as the construction of both the steam-chamber and the drier may be varied in many respects, and they may also be combined together and arranged otherwise than shown without departure from my said invention.

What I claim, and desire to secure by Letters Patent, is—

1. The mode herein described of curing grain and destroying the germ therein, by first subjecting the grain to the action of steam by direct contact therewith, and then drying the same, substantially as set forth.

2. An apparatus for curing grain and destroying the germ therein, composed of a steam-heating chamber in combination with a drying-chamber, organized and operating substantially as shown and described.

3. The arrangement of the perforated steam-pipes within the steam-chamber so as to equally diffuse the heat throughout the mass of grain, substantially as shown and set forth.

4. In combination with the drying-column, the perforated grain-receiving funnel with sides inclined at an angle of eighty degrees or thereabout to the horizontal, substantially as shown and set forth.

In testimony whereof I have signed my name to this specification before two subscribing witnesses.

HENRY H. BEACH.

Witnesses:
M. BAILEY,
EDM. F. BROWN.